US009942652B2

(12) United States Patent
Okamoto et al.

(10) Patent No.: US 9,942,652 B2
(45) Date of Patent: Apr. 10, 2018

(54) TERMINAL DEVICE AND INFORMATION OUTPUT METHOD

(71) Applicant: FUJI XEROX CO., LTD., Tokyo (JP)

(72) Inventors: Seiji Okamoto, Yokohama (JP);
Tsutomu Udaka, Yokohama (JP);
Tomoyuki Mitsuhashi, Yokohama (JP);
Junichi Hirota, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/226,087

(22) Filed: Aug. 2, 2016

(65) Prior Publication Data
US 2017/0201824 A1 Jul. 13, 2017

(30) Foreign Application Priority Data

Jan. 8, 2016 (JP) ................................. 2016-002188

(51) Int. Cl.
| | |
|---|---|
| *H04N 1/00* | (2006.01) |
| *H04R 1/32* | (2006.01) |
| *H04R 1/08* | (2006.01) |
| *H04R 29/00* | (2006.01) |
| *H04R 3/00* | (2006.01) |
| *H04R 27/00* | (2006.01) |

(52) U.S. Cl.
CPC ......... *H04R 1/326* (2013.01); *H04N 1/00007* (2013.01); *H04N 1/00029* (2013.01); *H04N 1/00058* (2013.01); *H04R 1/08* (2013.01); *H04R 29/00* (2013.01); *H04R 3/00* (2013.01); *H04R 27/00* (2013.01); *H04R 2227/003* (2013.01); *H04R 2499/11* (2013.01)

(58) Field of Classification Search
CPC ........................... H04R 1/326; H04N 1/00007
USPC ........................................................... 381/56
See application file for complete search history.

(56) References Cited

U.S. PATENT DOCUMENTS

| | | | |
|---|---|---|---|
| 6,772,633 B2 | 8/2004 | Terry et al. | |
| 7,136,605 B2 * | 11/2006 | Tsunoda | ............... G01N 1/2202 |
| | | | 399/91 |
| 7,502,570 B2 | 3/2009 | Nishimura | |
| 8,150,278 B2 * | 4/2012 | Satoh | ................. G03G 21/0011 |
| | | | 399/34 |
| 8,864,130 B2 * | 10/2014 | Umi | ......................... B65H 7/02 |
| | | | 271/10.02 |
| 2002/0073025 A1 | 6/2002 | Tanner et al. | |
| 2004/0112136 A1 | 6/2004 | Terry et al. | |

(Continued)

FOREIGN PATENT DOCUMENTS

| | | |
|---|---|---|
| JP | 2004144579 A | 5/2004 |
| JP | 2007-79263 A | 3/2007 |

(Continued)

OTHER PUBLICATIONS

Communication dated Jun. 17 2016 issued by the Japanese Intellectual Property Office in counterpart Japanese Patent Application No. 2016-002189.

(Continued)

*Primary Examiner* — Nafiz E Hoque
(74) *Attorney, Agent, or Firm* — Sughrue Mion, PLLC

(57) ABSTRACT

A terminal device includes a detection unit that detects sound, and an output unit that outputs information regarding a position of the detection unit relative to a target apparatus which is a target to detect the sound by the detection unit.

1 Claim, 17 Drawing Sheets

(56) References Cited

U.S. PATENT DOCUMENTS

| | | | |
|---|---|---|---|
| 2007/0032968 A1 | 2/2007 | Nakamura | |
| 2007/0070456 A1* | 3/2007 | Nishimura | B41J 29/393 |
| | | | 358/504 |
| 2012/0127831 A1 | 5/2012 | Gicklhorn et al. | |
| 2012/0224052 A1* | 9/2012 | Bae | G01B 11/02 |
| | | | 348/135 |
| 2013/0315405 A1 | 11/2013 | Kanishima et al. | |
| 2014/0003625 A1 | 1/2014 | Sheen et al. | |
| 2014/0140675 A1 | 5/2014 | de Sa et al. | |
| 2014/0342671 A1 | 11/2014 | Kim et al. | |
| 2015/0358779 A1 | 12/2015 | Yuksel | |
| 2016/0011850 A1 | 1/2016 | Sheen et al. | |
| 2016/0061586 A1* | 3/2016 | Broga | G01B 11/285 |
| | | | 348/140 |

FOREIGN PATENT DOCUMENTS

| | | |
|---|---|---|
| JP | 2008-290288 A | 12/2008 |
| JP | 5954648 B1 | 7/2016 |

OTHER PUBLICATIONS

Office Action dated Mar. 16, 2017, issued by the Australian Intellectual Property Office in counterpart Australian Application No. 2016222349.

Parker, C., "How to use S Beam" Mar. 11, 2013, https://web.archive.Org/web/20130312210017/http://www.androidauthority.com:80/how-to-use-s-beam-android-168272/, 12 pages total.

Communication dated Aug. 7, 2017, issued by the United States Patent and Trademark Office in counterpart U.S. Appl. No. 15/226,001.

Communication dated Aug. 23, 2017, issued by the Australian Patent Office in counterpart Australian Patent Application No. 2016216549.

Office Action dated Mar. 1, 2017, by the United States Patent and Trademark Office in counterpart U.S. Appl. No. 15/226,001.

* cited by examiner

FIG. 5

| MODEL NAME: ABC001 | | |
|---|---|---|
| WAVEFORM DATA OF FREQUENCY ANALYSIS RESULT | SOUND DATA OF ABNORMAL SOUND | CAUSE OF ABNORMAL SOUND | COUNTERMEASURE |
| WAVEFORM DATA 1 | SOUND DATA 1 | ABRASION OF PHOTOCONDUCTOR | REPLACEMENT OF PHOTOCONDUCTOR |
| WAVEFORM DATA 2 | SOUND DATA 2 | GREASE SHORTAGE OF SHEET TRANSPORT APPARATUS | APPLY GREASE |
| ..... | ..... | ..... | ..... |
| WAVEFORM DATA 30 | SOUND DATA 30 | DEFECT OF DRIVE MOTOR | REPLACEMENT OF DRIVE MOTOR |

MODEL NAME: ABC002

MODEL NAME: ABC003

TERMINAL DEVICE AND INFORMATION OUTPUT METHOD

CROSS-REFERENCE TO RELATED APPLICATIONS

This application is based on and claims priority under 35 USC 119 from Japanese Patent Application No. 2016-002188 filed on Jan. 8, 2016.

BACKGROUND

Technical Field

The present invention relates to a terminal device and an information output method.

SUMMARY

According to an aspect of the invention, there is provided a terminal device including a detection unit that detects sound; and an output unit that outputs information regarding a position of the detection unit relative to a target apparatus which is a target to detect the sound by the detection unit.

BRIEF DESCRIPTION OF DRAWINGS

Exemplary embodiments of the present invention will be described in detail based on the following figures, wherein:

FIG. 5 is a diagram illustrating an instance of information stored in a waveform data storing unit 53 illustrated in FIG. 4;

DETAILED DESCRIPTION

Hereinafter, exemplary embodiments of the invention will be described in detail with reference to the drawings.

Figure 1:
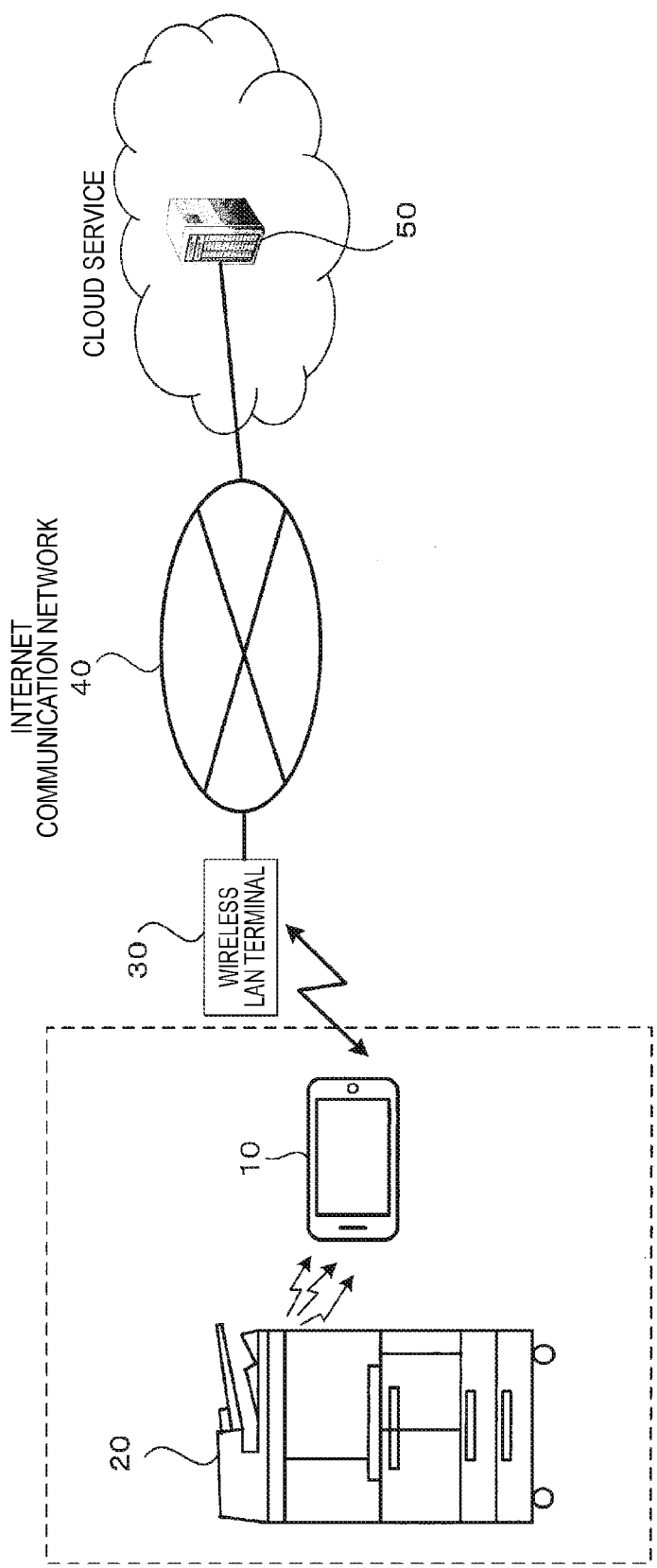
FIG. 1 is a diagram illustrating a configuration of a diagnosis system of an exemplary embodiment of the invention.

FIG. 1 is a diagram illustrating a configuration of a diagnosis system of an exemplary embodiment of the invention.

The diagnosis system according to the exemplary embodiment of the invention includes a portable terminal device 10 such as a personal computer, a smart phone, or a tablet terminal device, and a server apparatus 50 as illustrated in FIG. 1.

The terminal device 10 includes a diagnostic device that diagnoses an image forming apparatus 20 from sound emitted from the image forming apparatus 20, and any terminal device is applicable to the invention, as long as the terminal device 10 can be connected to the server apparatus 50 through a communication network. However, the description in this exemplary embodiment will be made using a case where the terminal device 10 is a tablet terminal device which is provided with a device such as a microphone to acquire a sound signal and a touch panel to receive a touch input.

The terminal device 10 is carried by a service engineer (maintenance personnel) who maintains or repairs an image forming apparatus 20 such as a printer used by an end user. The terminal device 10 is used to acquire a sound signal generated in the image forming apparatus 20 for a frequency analysis on the acquired sound signal, or to display a waveform obtained as a result of the frequency analysis on the sound signal acquired from the server apparatus 50 in the past together with the waveform obtained as a result of the frequency analysis on the acquired sound signal.

The terminal device 10 and the server apparatus 50 are connected to each other through a wireless LAN terminal 30 such as a Wi-Fi router or an Internet communication network 40, and transmit and receive information.

When the terminal device 10 is a mobile phone device or a smart phone, the terminal device 10 and the server apparatus 50 can also be connected through a mobile phone network to transmit and receive defect information.

In the diagnosis system of this exemplary embodiment, when an abnormal sound is generated in the image forming apparatus 20 which is a target electronic apparatus installed in a place of the end user, the service engineer goes to the place of the image forming apparatus 20 with the terminal device 10. The service engineer records the generated sound using the terminal device 10 to acquire the sound signal, and performs a diagnosis specifying a cause of the abnormal sound.

It is also technically possible to provide a microphone in the image forming apparatus 20 to have a sound recording function so as to record the abnormal sound when the abnormal sound is generated. However, in a case where the image forming apparatus 20 is installed in an office of the end user, it may be not realized to provide the sound recoding function in the image forming apparatus 20 due to a security problem.

Figure 2:
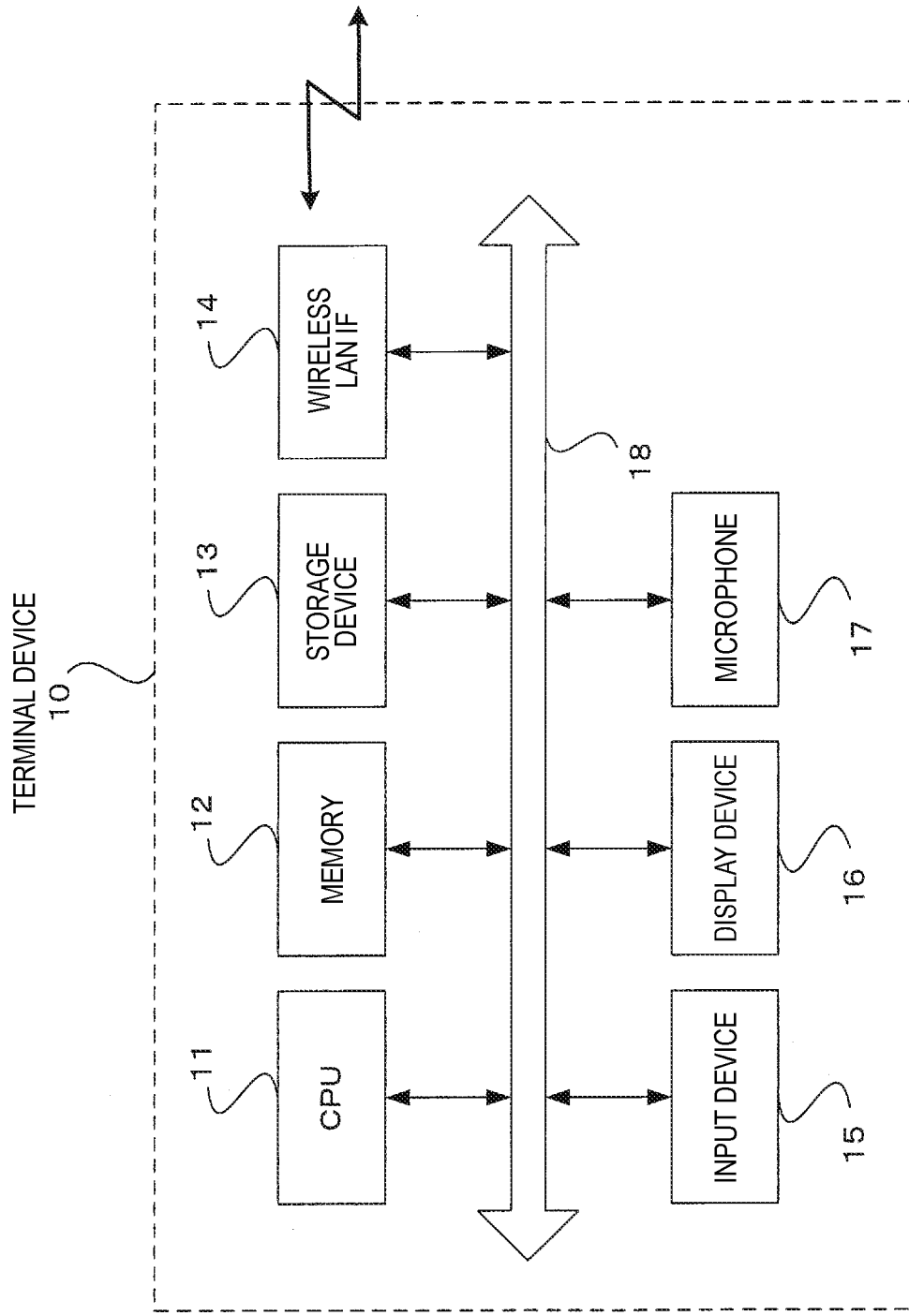
FIG. 2 is a block diagram illustrating a hardware configuration of a terminal device 10 in the exemplary embodiment of the invention.

Next, a hardware configuration of the terminal device 10 in the diagnosis system according to this exemplary embodiment is illustrated in FIG. 2.

As illustrated in FIG. 2, the terminal device 10 includes a CPU 11, a memory 12 capable of temporarily storing data, a storage device 13 such as a flash memory, a wireless LAN interface (IF) 14 that performs wireless communication with the wireless LAN terminal 30 or the image forming apparatus 20 to transmit and receive data, an input device 15 such as a touch sensor, a display device 16, and a microphone 17. These components are interconnected through a control bus 18.

The terminal device 10 according to this exemplary embodiment includes a touch panel in which a touch sensor for detecting a touch position on the display device 16 is provided as the input device 15, and thus display is performed and input is performed by the user, using the touch panel.

The CPU 11 controls the operation of the terminal device 10 by executing a predetermined process based on a control program stored in the memory 12 or the storage device 13. This control program may be acquired by being downloaded through the Internet communication network 40 or a mobile phone network and be provided to the CPU 11. Alternatively, the program can be stored in a storage medium such as a CD-ROM and provided to the CPU 11.

The microphone 17 detects sound emitted from the image forming apparatus 20 to be diagnosed. The output of the microphone 17 is input as sound data that is adjusted by a predetermined gain.

When the control program described above is executed, the terminal device 10 according to this exemplary embodiment performs an operation to be described below and supports service engineer's operation for specifying the cause of the abnormal sound.

Figure 3:
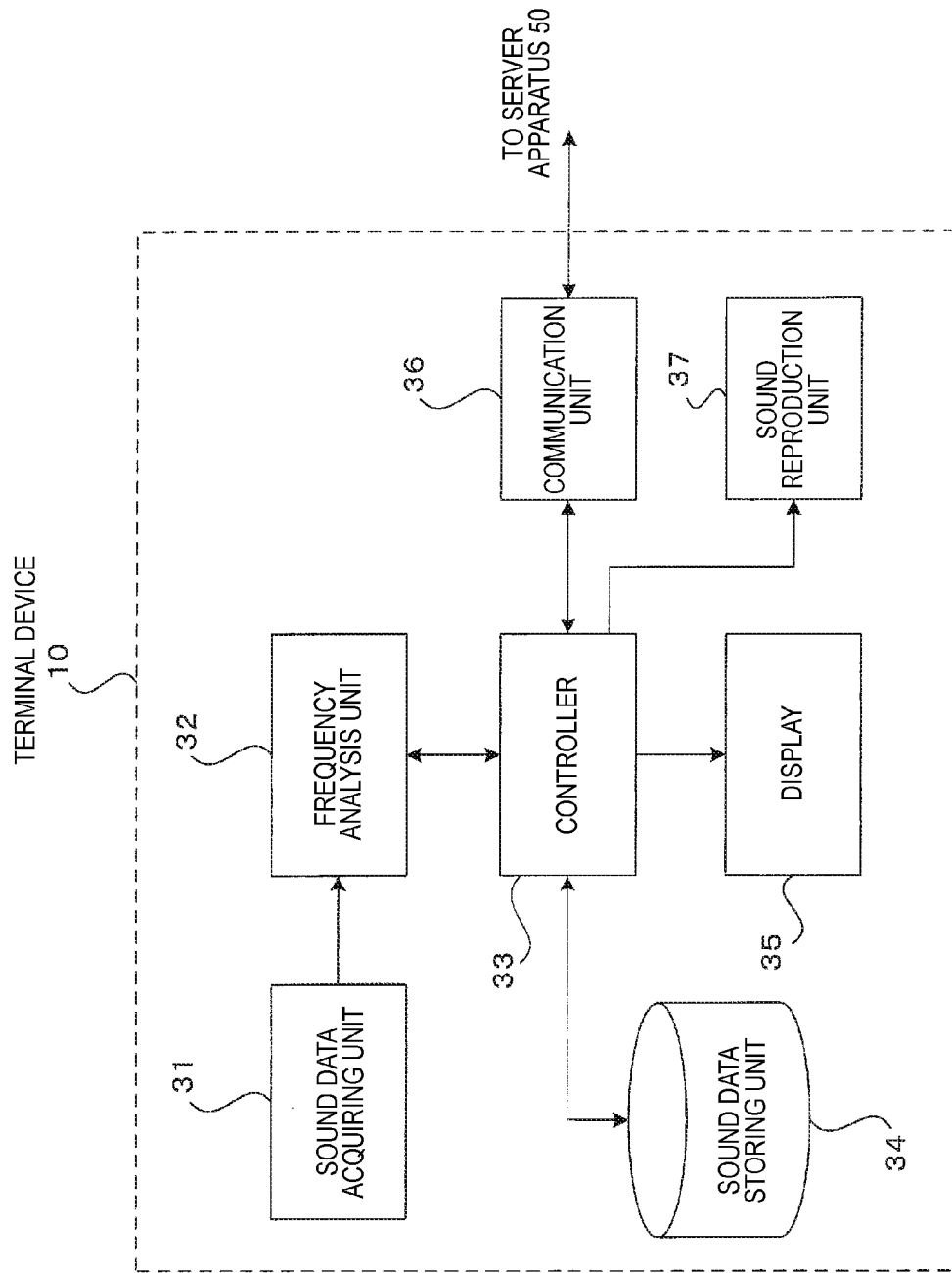
FIG. 3 is a block diagram illustrating a functional configuration of the terminal device 10 according to the exemplary embodiment of the invention.

FIG. 3 is a block diagram illustrating a functional configuration of the terminal device 10 which is realized by the execution of the control program.

As illustrated in FIG. 3, the terminal device 10 according to this exemplary embodiment includes a sound data acquiring unit 31, a frequency analyzing unit 32, a controller 33, a sound data storing unit 34, a display 35, a communication unit 36, and a sound reproduction unit 37.

The display 35 displays various types of data based on the control of the controller 33. The communication unit 36 communicates with the server apparatus 50, which is an external device. The sound reproduction unit 37 reproduces recorded sound data and converts the sound data into a sound signal by the control of the controller 33.

The sound data acquiring unit 31 receives a sound generated in the image forming apparatus 20, which is an analysis target apparatus, to acquire data for diagnosis.

The frequency analyzing unit 32 performs a time frequency analysis (time-dependent frequency analysis) of a signal for diagnosis acquired by the sound data acquiring unit 31 and generates frequency spectrum waveform (a first waveform of frequency analysis result) data representing a temporal change in a signal intensity distribution for each frequency of the acquired diagnostic signal.

Specifically, the frequency analyzing unit 32 performs an STFT (short time Fourier transform) on the sound signal acquired by the sound data acquiring unit 31 to generate the frequency spectrum waveform data.

The controller 33 stores the frequency spectrum waveform data acquired by the frequency analyzing unit 32 together with the sound data in the sound data storing unit 34.

The controller 33 instructs the frequency analyzing unit 32 to perform a fast Fourier transform (1D-FFT) in which the frequency analysis in a time-axial direction is performed on the frequency component, which is estimated to be the abnormal sound, in the frequency spectrum waveform data acquired by the frequency analyzing unit 32.

Here, the controller 33 extracts a signal component having a periodicity out of frequency spectrum waveform data and thus may select the signal component as a signal component having a high possibility of an abnormal sound. The controller 33 displays the obtained frequency spectrum data on the display 35 to control a user to designate a frequency having a high possibility of an abnormal sound when viewing the frequency spectrum waveform, and may select the frequency component as a signal component having a high possibility of an abnormal sound.

The frequency analyzing unit 32 performs the fast Fourier transform in the time-axial direction with respect to a frequency component, which is estimated to be the abnormal sound, based on the instruction of the controller 33.

The controller 33 extracts information regarding a period and a frequency of the abnormal sound from the analysis result of the fast Fourier transform in the frequency analyzing unit 32.

In addition, the controller 33 transmits the acquired information of the period and the frequency of the abnormal sound to the server apparatus 50 through the communication unit 36 together with model information such as a model name and a serial number of the image forming apparatus 20, and operating state information indicating an operating state of the image forming apparatus 20. Specifically, the operating state information may include information such as color print/monochrome print, single-side print/duplex print, one of scanning, print, and copy as an operation mode, and the kind of used sheet. In this way, the controller 33 transmits the information obtained from the frequency spectrum waveform data which is obtained by the frequency analyzing unit 32 to the server apparatus 50 through the communication unit 36.

The server apparatus 50 stores the spectrum waveform data obtained through the frequency analysis on sound signals of abnormal sounds generated in the past in an apparatus as equivalent to the image forming apparatus 20 together with information such as original sound data, an operating state of the apparatus at the time of acquisition of the sound data, a cause of the for the abnormal sound, and a countermeasure for the for the abnormal sound.

The server apparatus 50 retrieves the frequency spectrum waveform (a waveform of a second frequency analysis result) data corresponding to the frequency spectrum waveform data obtained as a result of the frequency analysis by the frequency analyzing unit 32 from the information on the period and the frequency of the abnormal sound transmitted from the terminal device 10. The server apparatus 50 transmits the frequency spectrum waveform data thus found to the terminal device 10 together with the information such as the sound data stored as sample waveform data of the abnormal sound.

As a result, the controller 33 receives the frequency spectrum waveform data corresponding to the frequency spectrum waveform data obtained as a result of the frequency analysis performed by the frequency analyzing unit 32 from the server apparatus 50 through the communication unit 36.

The controller 33 controls the display 35 to display the frequency spectrum waveform obtained through the frequency analysis of the sound signal acquired by the sound data acquiring unit 31, and the spectrum waveform received from the server apparatus 50 in parallel manner.

At this time, based on a user's operation, the controller 33 changes a display position in the time-axial direction of one of the frequency spectrum waveform obtained through the frequency analysis of the sound signal acquired by the sound data acquiring unit 31 and the spectrum waveform transmitted from the server apparatus 50.

The controller 33 may change the display position in the time-axis direction of at least one of two frequency spectrum waveforms such that the periodic waveform position of the frequency spectrum waveform obtained through the frequency analysis of the diagnostic data acquired by the sound data acquiring unit 31 matches that of the spectrum waveform transmitted from the server apparatus 50.

Either one of the frequency spectrum waveform obtained through the frequency analysis of the diagnostic data acquired by the sound data acquiring unit 31 and the spectrum waveform transmitted from the server apparatus 50 is set to be the waveform having a longer period of time than the other waveform.

In this exemplary embodiment, as an instance, the frequency spectrum waveform obtained through the frequency analysis of the diagnostic data acquired by the sound data acquiring unit 31 has data of about 4 to 16 seconds, and the frequency spectrum waveform transmitted from the server apparatus 50 has data of about 8 seconds.

In a case where there are plural frequency spectrum waveform data transmitted from the server apparatus 50, the controller 33 controls the display 35 such that data having a high degree of similarity to the frequency spectrum waveform data obtained through the frequency analysis of the frequency analyzing unit 32 is displayed by priority among the plural frequency spectrum waveform data.

Furthermore, when either one of the frequency spectrum waveform obtained through the frequency analysis of the sound signal acquired by the sound data acquiring unit 31 and the spectrum waveform transmitted from the server apparatus 50 is enlarged or reduced, the controller 33 enlarges or reduces the other waveform to have the same size.

When a processing speed (image forming speed) of the image forming apparatus 20 at the time of acquisition of the waveform of the sound is different from a processing speed of the image forming apparatus at the time of acquisition of the frequency spectrum waveform transmitted from the server apparatus 50, the controller 33 may extend or reduce the length in the time-axis direction of the frequency spectrum waveform transmitted from the server apparatus 50 according to two processing speeds.

This is because the period of the abnormal sound to be generated also varies when the processing speed varies and thus correct comparison cannot be performed in a case of comparison without a change. The reason of acquiring and preparing diagnostic data for each of several processing speeds is that the amount of data becomes larger and a labor of acquiring the diagnostic data becomes also increase.

When the user instructs reproduction of the sound data, according to the control of the controller 33, the sound reproduction unit 37 may reproduce the sound data acquired by the sound data acquiring unit 31 and the sound data corresponding to the frequency spectrum waveform transmitted from the server apparatus 50 as a left signal and a right signal of stereophonic reproduction, respectively.

In order to facilitate the comparison of two frequency spectrum waveforms, the controller 33 may display an adjustable frequency-auxiliary line indicating the same frequency and an adjustable common time-axis auxiliary line used to compare positions in the time-axis direction in a superimposed manner, on two frequency spectrum waveform displayed in parallel.

Next, a functional configuration of the server apparatus 50 in the abnormal sound diagnosis system according to this exemplary embodiment will be described with reference to a block diagram of FIG. 4.

Figure 4:
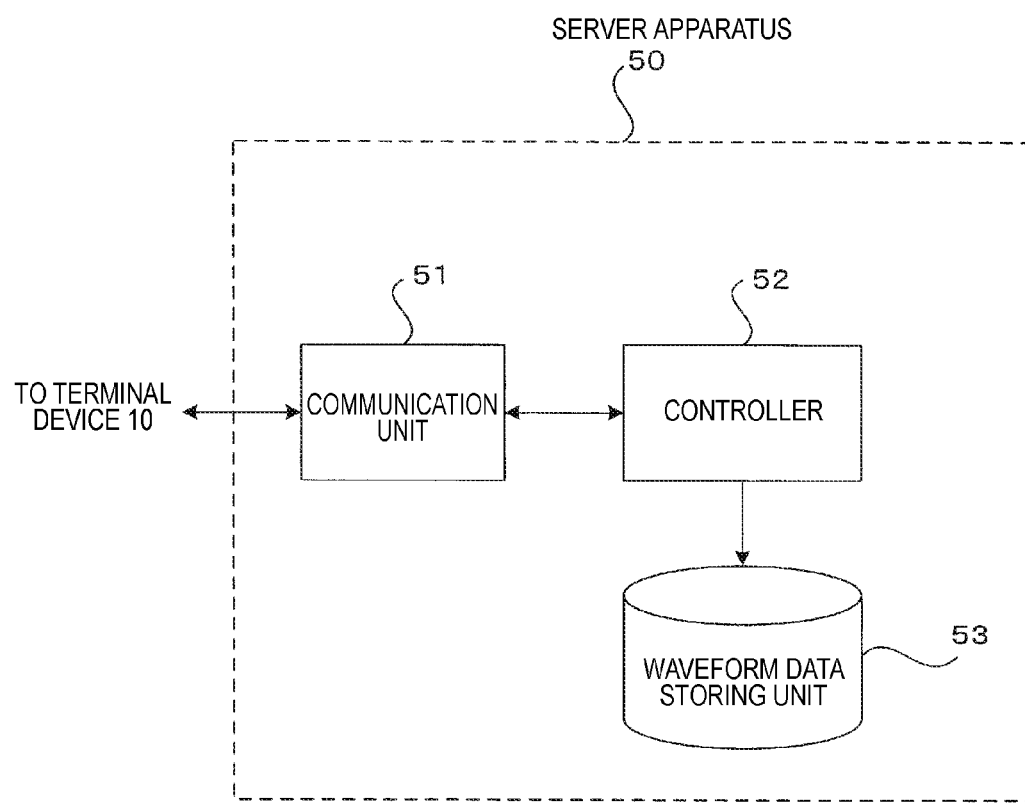
FIG. 4 is a block diagram illustrating a functional configuration of a server apparatus 50 in the first exemplary embodiment of the invention.

The server apparatus 50 of this exemplary embodiment is provided with a communication unit 51, a controller 52, and a waveform data storing unit 53 as illustrated in FIG. 4.

The waveform data storing unit 53 stores plural pieces of frequency spectrum waveform data obtained through the frequency analysis on the abnormal sound generated in the past in an apparatus equivalent to the image forming apparatus 20 that is an analysis target apparatus.

Specifically, the waveform data storing unit 53 stores information such as frequency spectrum waveform data obtained through the time frequency analysis on the sound data acquired in advance, the original sound data, a cause of the abnormal sound, and a countermeasure thereof for each model as illustrated in FIG. 5.

In a case where the information of the period and the frequency of the abnormal sound is received from the terminal device 10, the controller 52 selects waveform data similar to the waveform data of the frequency spectrum based on the abnormal sound acquired in the terminal device 10 from among the waveform data of the plural of frequency spectrums stored in the waveform data storing unit 53 based on the received information of the period and the frequency of the abnormal sound. The controller 52 transmits the selected waveform data to the terminal device 10 through the communication unit 51.

In the exemplary embodiment, the terminal device 10 executes the STFT or the fast Fourier transform on the sound data of the abnormal sound and transmits the information regarding the period and frequency of the abnormal sound to the server apparatus 50, as described above. However, the fast Fourier transform or the STFT may be executed on the side of the server apparatus 50.

In this case, the sound data is directly transmitted to the server apparatus 50 from the terminal device 10, the frequency spectrum waveform data obtained by the STFT on the sound data is transmitted, and the server apparatus 50 executes the STFT or the fast Fourier transform on the sound data.

Figure 7:
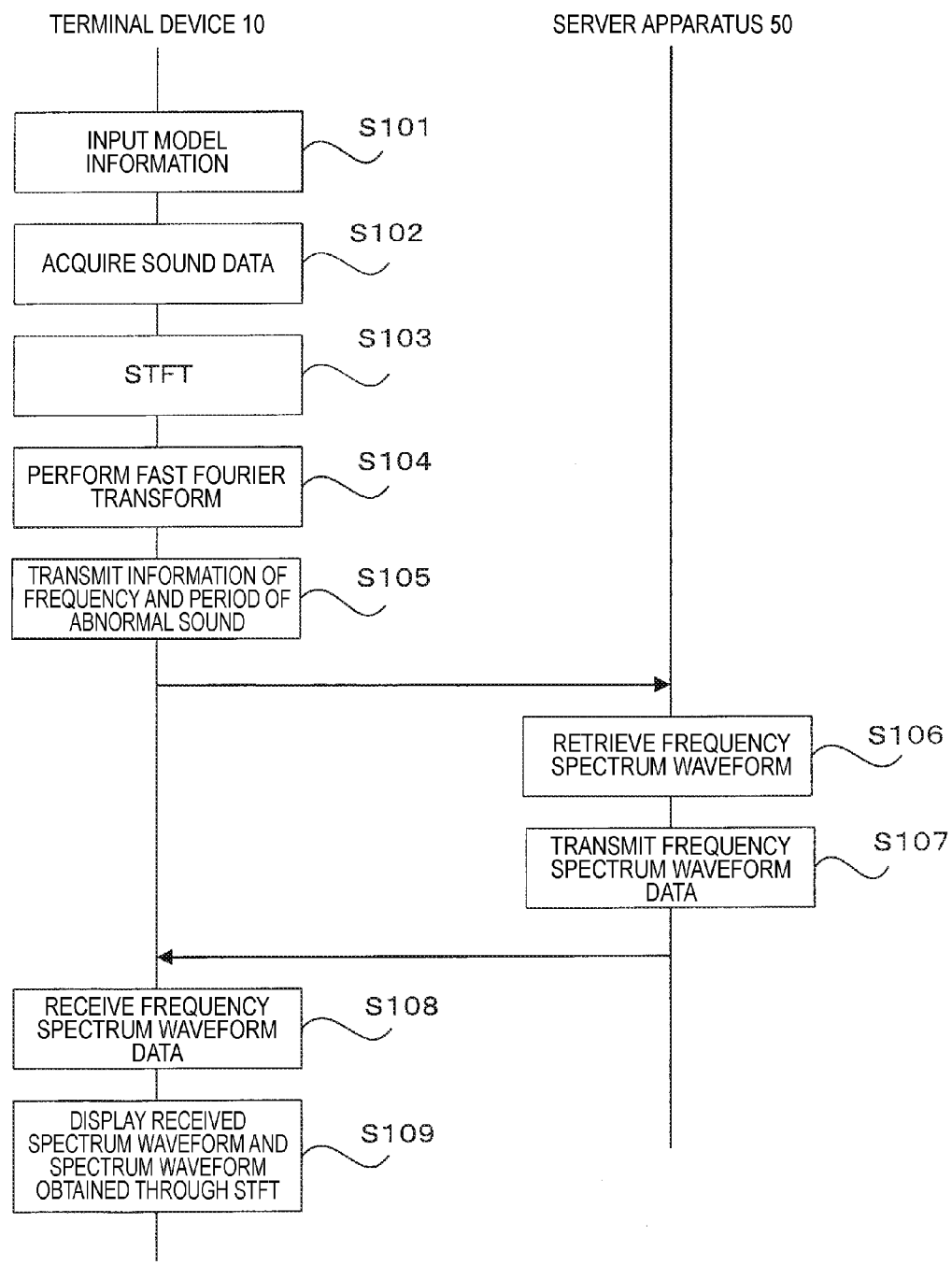
FIG. 7 is a sequence chart illustrating an operation of the diagnosis system of the exemplary embodiment of the invention.

Next, the operation of the abnormal sound diagnosis system according to this exemplary embodiment will be described with reference to a sequence chart illustrated in FIG. 7.

Figure 6:
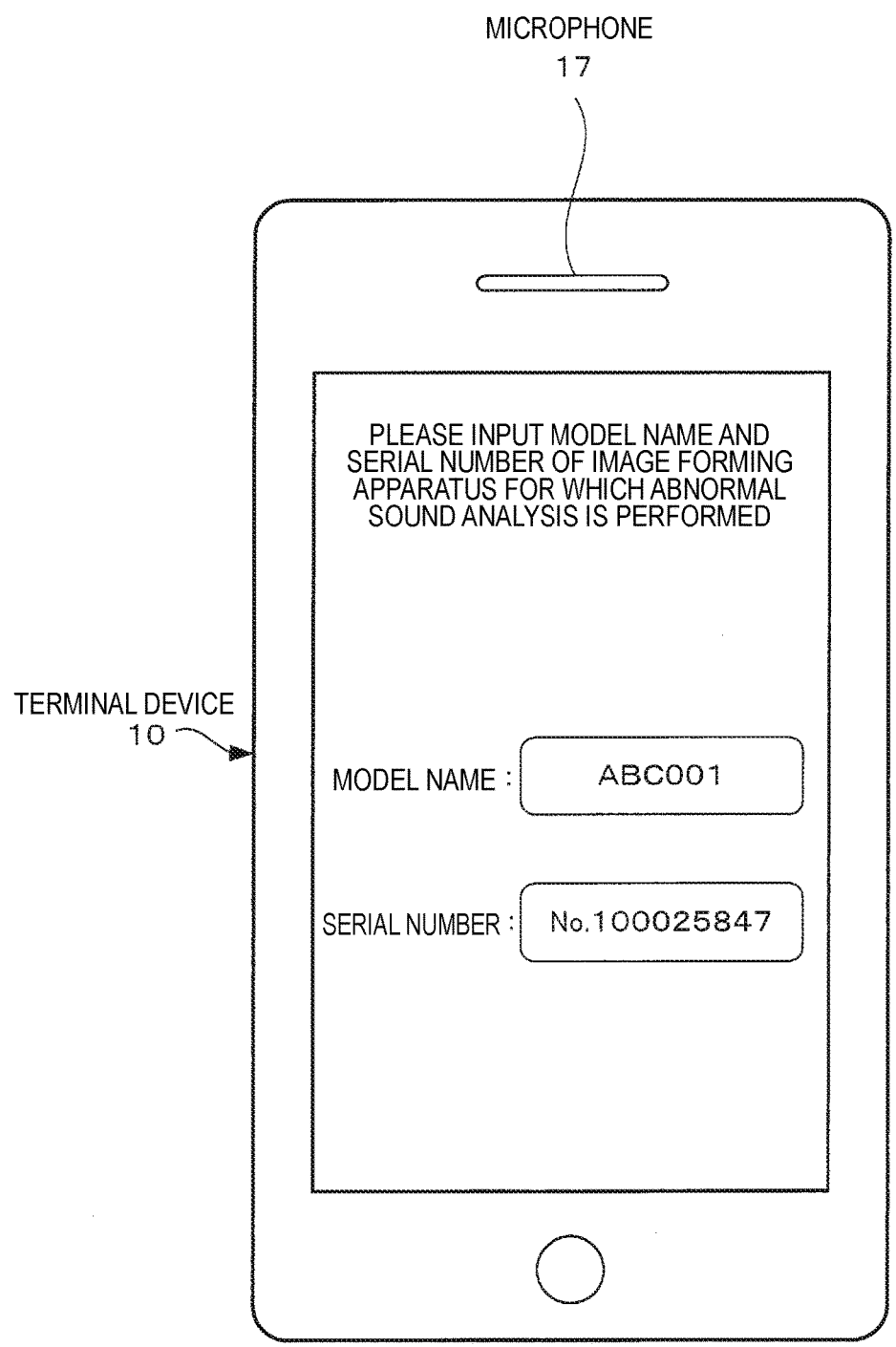
FIG. 6 is a diagram illustrating an exemplary screen used to input models for performing abnormal sound diagnosis.

In a case where the terminal device 10 performs an abnormal diagnosis to specify a cause of the abnormal sound, an image as illustrated in FIG. 6 is displayed, and various types of information such as a model name, a serial number, and an operating state are input (Step S101).

The terminal device 10 sets the operation mode to a recording mode and performs the recording by causing the microphone 17 to approach a place where the abnormal sound is generated in the image forming apparatus 20, thereby acquiring the diagnostic data (Step S102).

The holding of the microphone 17 toward the image forming apparatus 20 needs experience. Therefore, the present terminal device 10 is prepared with a program for showing how to hold the terminal device 10 at any position. The details of the program will be described below.

Next, in the terminal device 10, the frequency analyzing unit 32 performs the STFT on the acquired sound data to generate the frequency spectrum waveform indicating the temporal change in distribution of the signal intensity for each frequency (Step S103).

Figure 8:
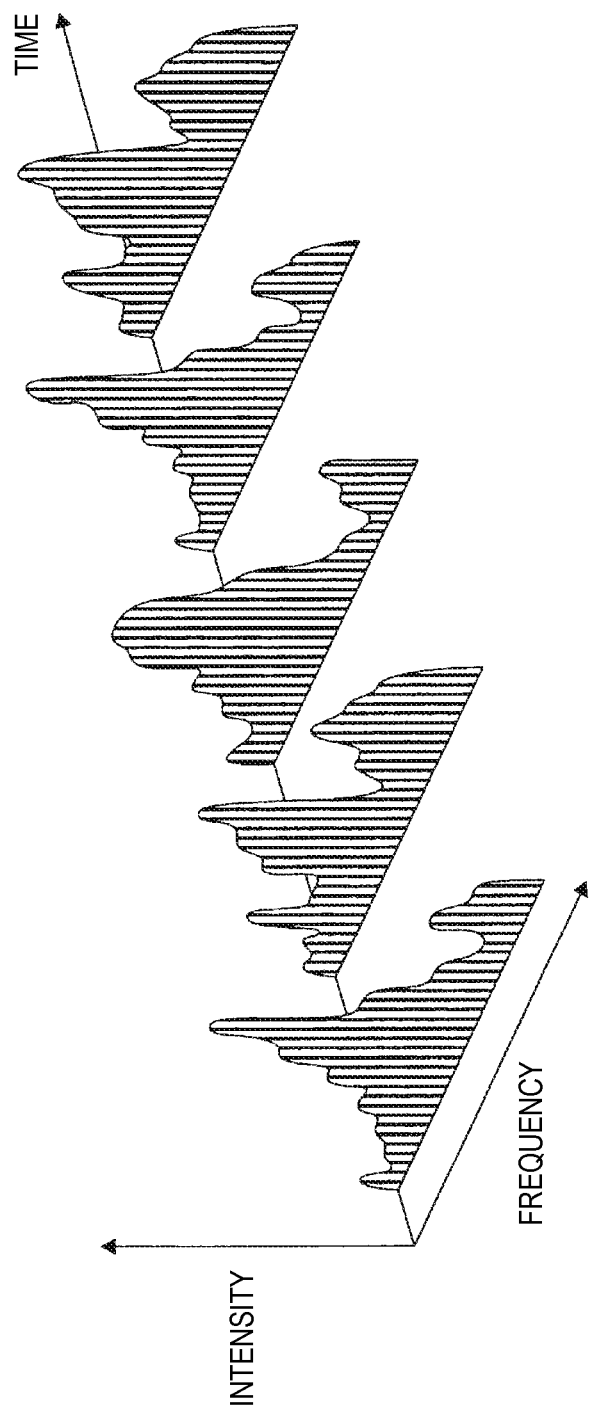
FIG. 8 is a diagram illustrating a concept of an STFT.
Figure 9:
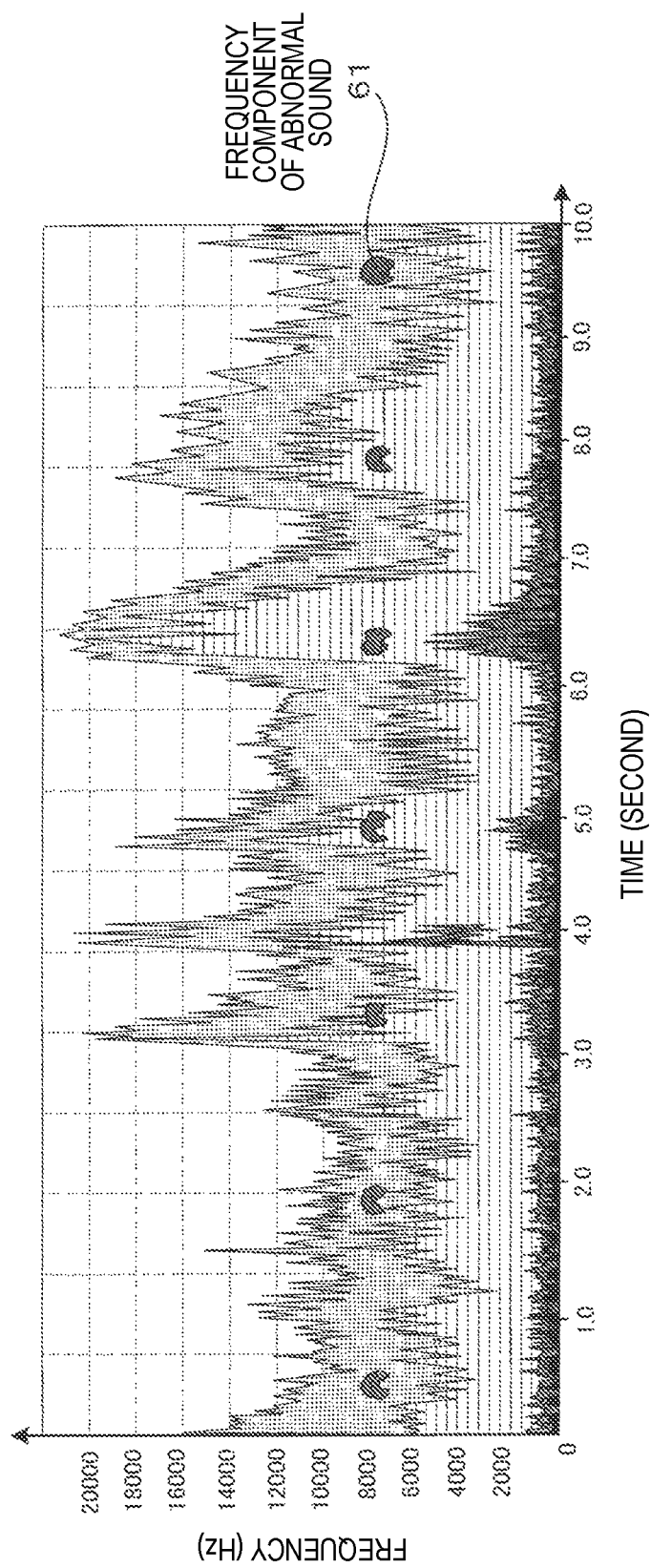
FIG. 9 is a diagram illustrating an exemplary image of a frequency spectrum waveform based on an analysis result obtained by the STFT.

In the STFT, the Fourier transform is performed for every short time as illustrated in FIG. 8 to calculate the signal intensity according to the temporal change for each frequency component. FIG. 9 illustrates an instance of a waveform in a case where an image of each frequency spectrum waveform is obtained as an analysis result of the STFT.

In the instance of the frequency spectrum waveform illustrated in FIG. 9, the horizontal axis represents the time, the vertical axis represents the frequency, and intensity for each frequency is represented using a color. In FIG. 9, a difference in color is represented using hatching patterns. In addition, FIG. 9 illustrates an instance in a case where the intensity for each frequency is represented using a color, and the intensity may be represented using a gray scale.

In the instance of the frequency spectrum waveform illustrated in FIG. 9, it can be seen that a frequency component 61 of the abnormal sound is periodically generated to be displayed at a specific frequency. In the instance of the frequency spectrum waveform illustrated in FIG. 9, a low frequency component is a normal operation sound but is not a frequency component of the abnormal sound.

When the frequency spectrum waveform as illustrated in FIG. 9 is obtained, the controller 33 displays the frequency spectrum waveform on the display 35. Then, the user who is represented with the frequency spectrum waveform specifies the frequency component 61 of the abnormal sound. For instance, the user selects an area where the frequency component 61 of the abnormal sound is included by operating the touch panel.

Figure 10:
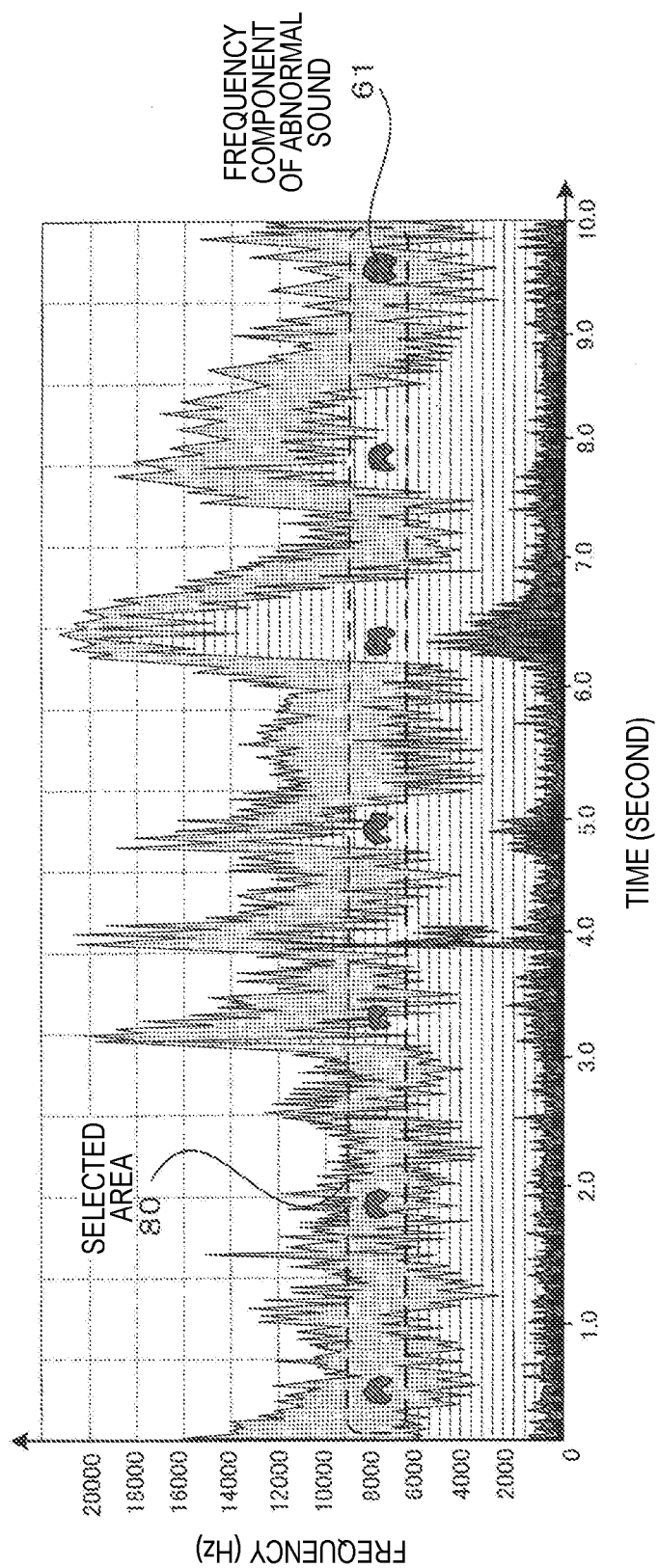
FIG. 10 is a diagram illustrating an example of a selected area 80 which is selected by the user in an exemplary image of the frequency spectrum waveform of FIG. 9.

An instance of a selected area 80 selected by the user as described above is illustrated in FIG. 10. In the instance illustrated in FIG. 10, it can be seen that a rectangular area containing the frequency component 61 of plural abnormal sounds is designated as the selected area 80.

When the selected area 80 is designated as described above, the fast Fourier transform (1D-FFT) is performed on the frequency component contained in the selected area 80 by the frequency analyzing unit 32 (Step S104). An exemplary analysis result of the fast Fourier transform performed as described above is illustrated in FIG. 11.

Figure 11:
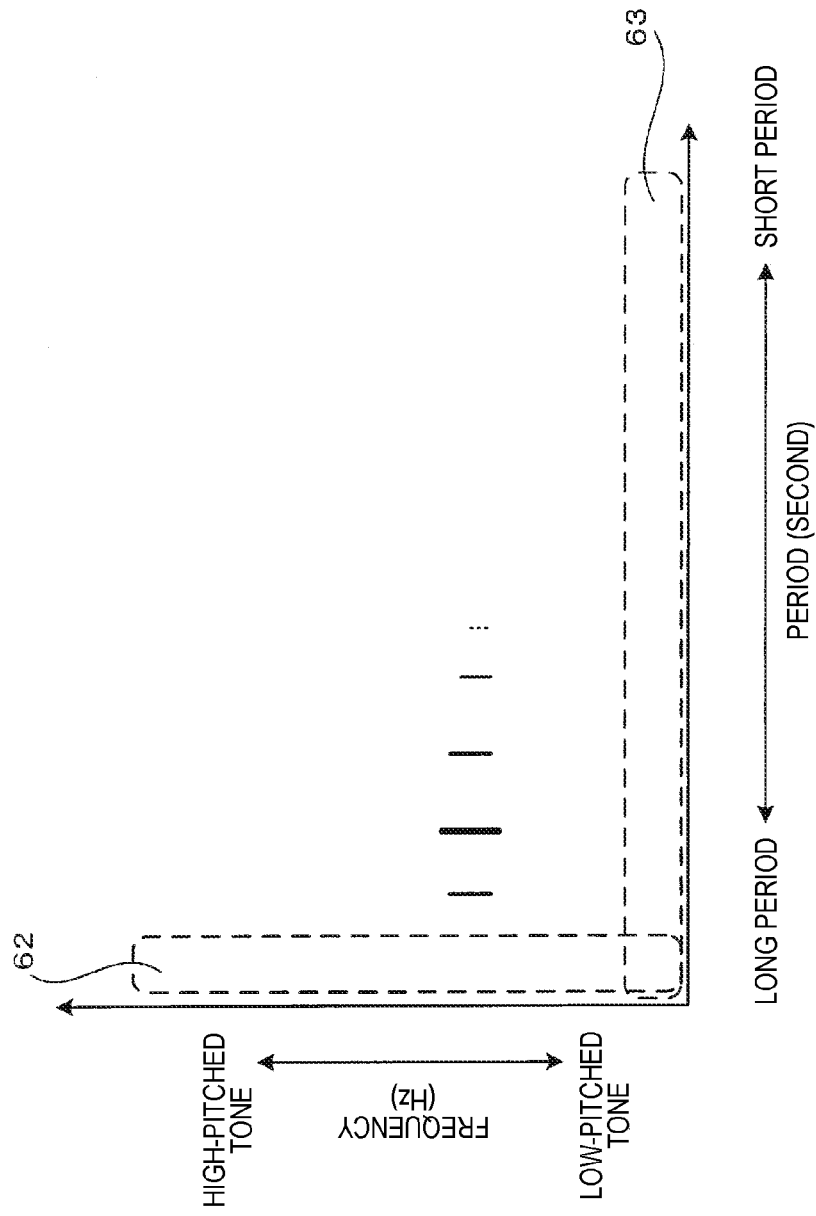
FIG. 11 is a diagram illustrating an exemplary analysis result of a fast Fourier transform.

In FIG. 11, the period and the frequency of the abnormal sound are specified by detecting the period and the frequency of the signal of the frequency component on which the fast Fourier transform is performed. Since the abnormal sound contains harmonic components, there may be detected plural of periods. However, a period of the strongest signal intensity is detected as the period of the abnormal sound.

In addition, a signal component having a long period equal to or more than a predetermined period is considered as of a normal operation sound or of a noise having no fixed period. Therefore, the area of such a long period signal component is set to an out-of-determination area 62, and the analysis result in the out-of-determination area 62 is ignored.

Furthermore, a signal component having a low frequency equal to or less than a predetermined frequency is also not distinguished from the normal operation sound. Therefore, the area of such a low frequency signal component is set to an out-of-determination area 63, and the analysis result in the out-of-determination area 63 is ignored.

The terminal device 10 transmits the information of the period and the frequency of the abnormal sound obtained as an analysis result of the fast Fourier transform to the server apparatus 50 together with the model information and the information of the operating state (Step S105). For instance, the information indicating that the frequency of the abnormal sound is 4 kHz and the period of the abnormal sound is 2.0 seconds is transmitted to the server apparatus 50.

The server apparatus 50 retrieves from the waveform data storing unit 53 based on the received information to extract the data of the frequency spectrum waveform corresponding to the received information (Step S106).

The server apparatus 50 transmits the extracted frequency spectrum waveform data to the terminal device 10 together with the information such as the original sound data, the cause of the abnormal sound, and the countermeasure thereof (Step S107).

The terminal device 10 receives the frequency spectrum waveform data which is transmitted from the server apparatus 50 (Step S108). The controller 33 of the terminal device 10 displays he received frequency spectrum waveform and the frequency spectrum waveform obtained through the STFT on the display 35 (Step S109).

Figure 12:
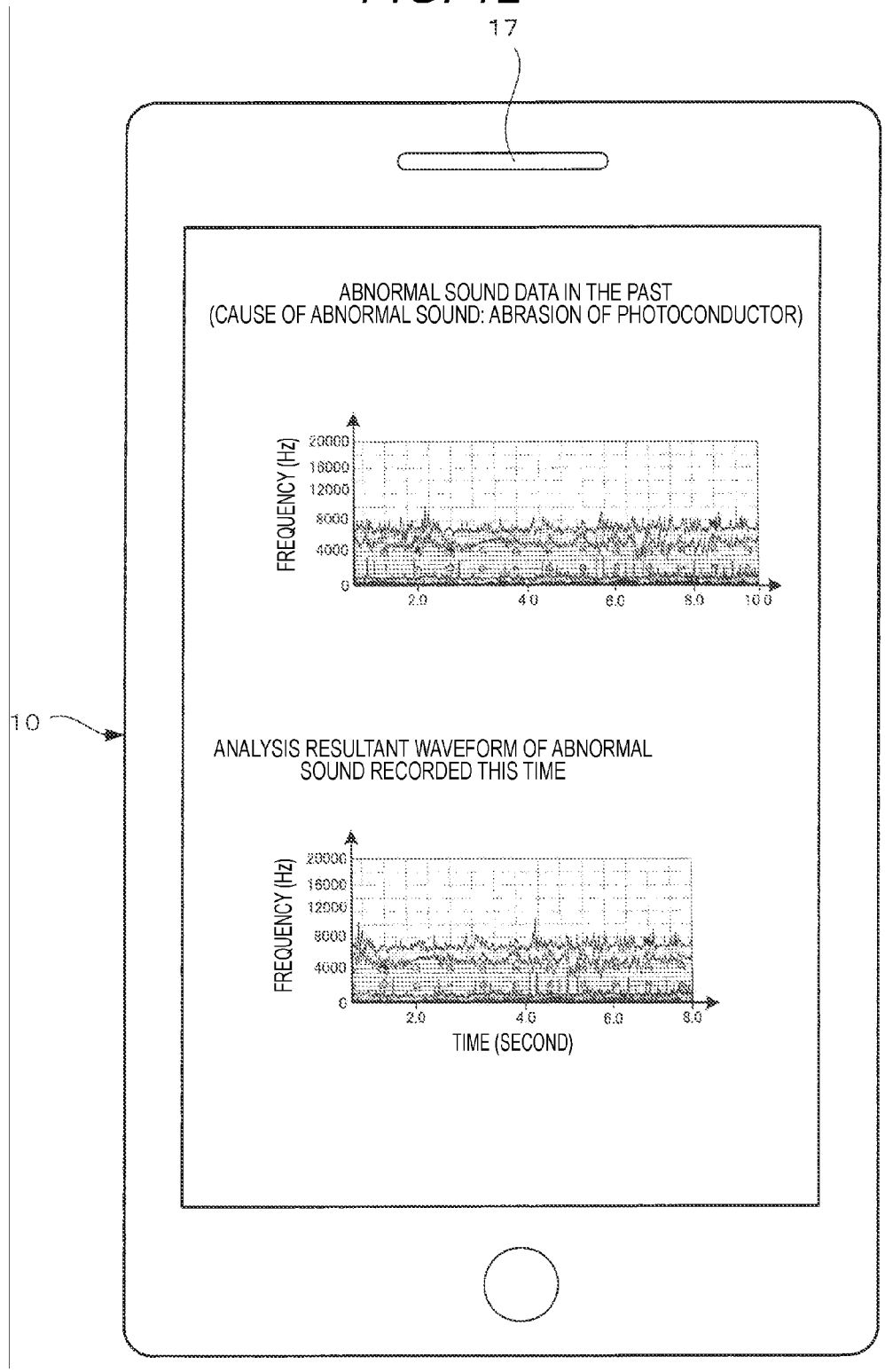
FIG. 12 is a diagram illustrating an exemplary screen of the terminal device 10 on which two frequency spectrum waveforms are displayed.

FIG. 12 illustrates an exemplary screen of the terminal device 10 on which the two frequency spectrum waveforms are displayed in this way.

In the exemplary screen illustrated in FIG. 12, it can be seen that the frequency spectrum waveform obtained through the STFT in the frequency analyzing unit 32 is displayed as "Analysis resultant waveform of recorded abnormal sound this time", and the frequency spectrum waveform transmitted from the server apparatus 50 is displayed as "Sound data in the past" together with "Abrasion of the photoconductor" as a cause of the abnormal sound.

The service engineer who diagnoses the abnormal sound compares these two frequency spectrum waveforms to determine whether the abnormal sound components in the waveforms are similar to each other, and specifies a cause of the abnormal sound.

A program for showing how to hold the terminal device 10 during the recording at any position to the service engineer to attempt a diagnosis will be described.

Figure 13:
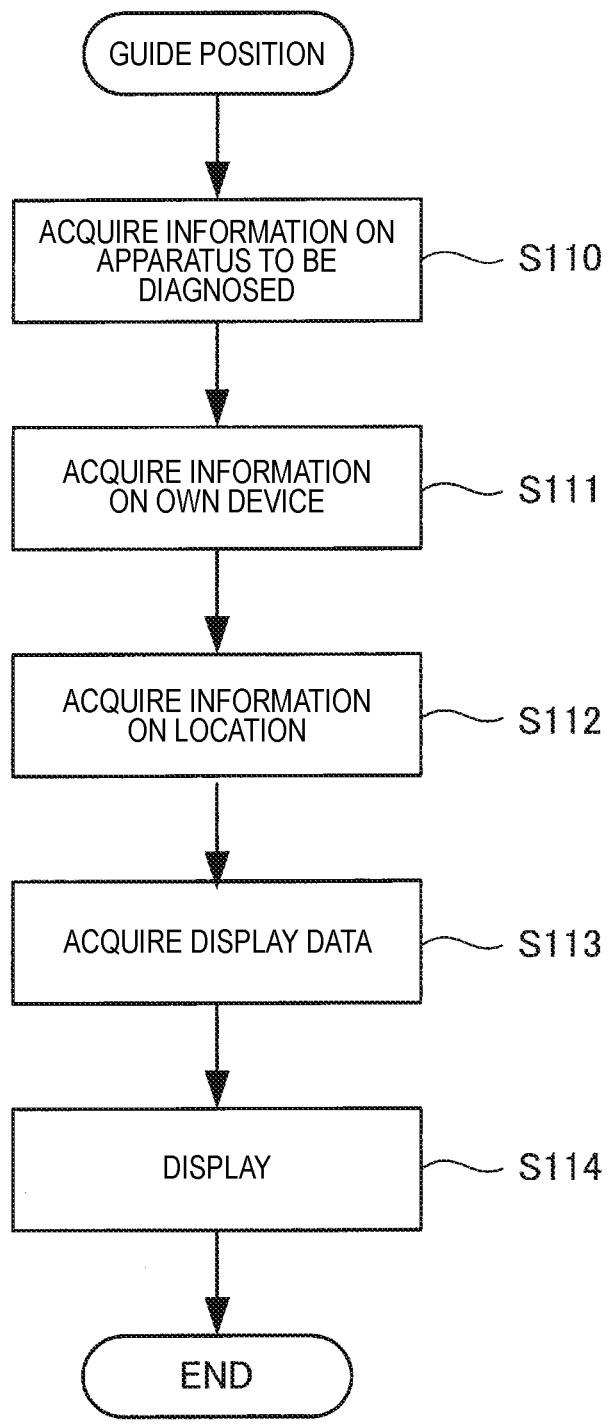
FIG. 13 is a flowchart illustrating an operation flow in the position guidance in the terminal device 10.

FIG. 13 is a flowchart for position guidance.

First, information on an apparatus to be diagnosed (image forming apparatus 20 in this exemplary embodiment) is acquired in step S110. For instance, a model is specified from the model name (ABC001 in FIG. 6) input in step S101 described above, and the corresponding model information is acquired.

In the next step S111, information regarding the terminal device 10 itself (or the own device) is acquired. The information includes, for instance, position information of the microphone 17 and sensitivity information of the microphone 17. The information of the terminal device is stored in the memory 12 and the storage device 13, but may be acquired from the server apparatus 50 through the Internet communication network 40, for instance.

Figure 14:
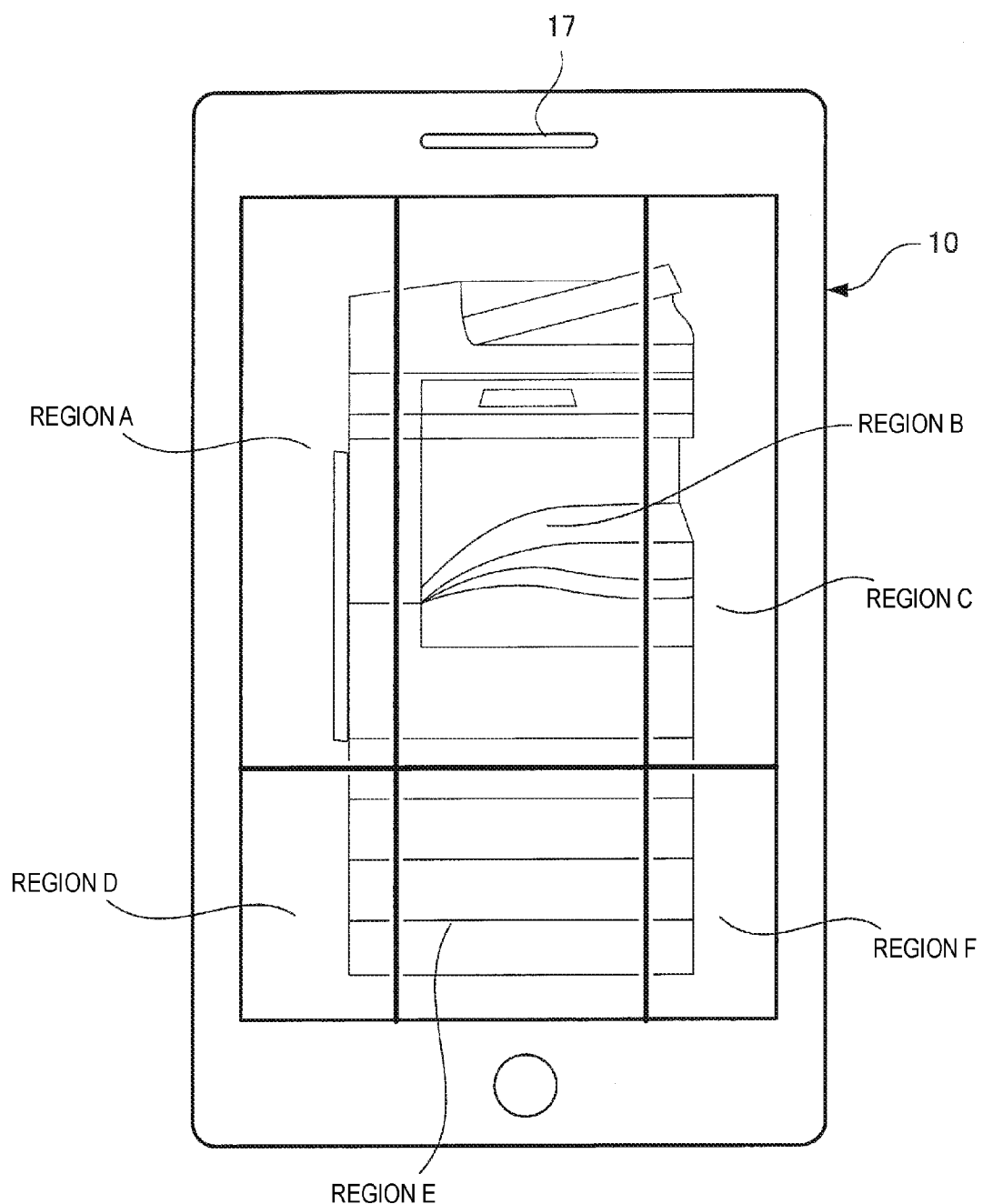
FIG. 14 is a diagram illustrating an exemplary screen in a case of designating a section of the terminal device 10.

In the next step S112, information regarding a section at which the recording is to be performed is acquired. For instance, as illustrated in FIG. 14, images of the image forming apparatus 20 are divided and displayed into six regions A to F in the terminal device 10. The service engineer to attempt the recording selects one region, for instance, the region B while listening to the abnormal sound emitted from the image forming apparatus 20. The selected region is accepted as information regarding the section.

The selection of the section may be achieved in a manner that, for instance, 'right', 'left', and 'top' are displayed and the displayed sections are designated, in addition to a manner of designating a region provided in a photo and a schematic diagram as described above.

In the next step S113, display data is acquired from the information regarding the apparatus to be diagnosed, the information regarding the own device, and the information regarding the section that are acquired in steps S110, 111, and 112, respectively.

Figure 15:
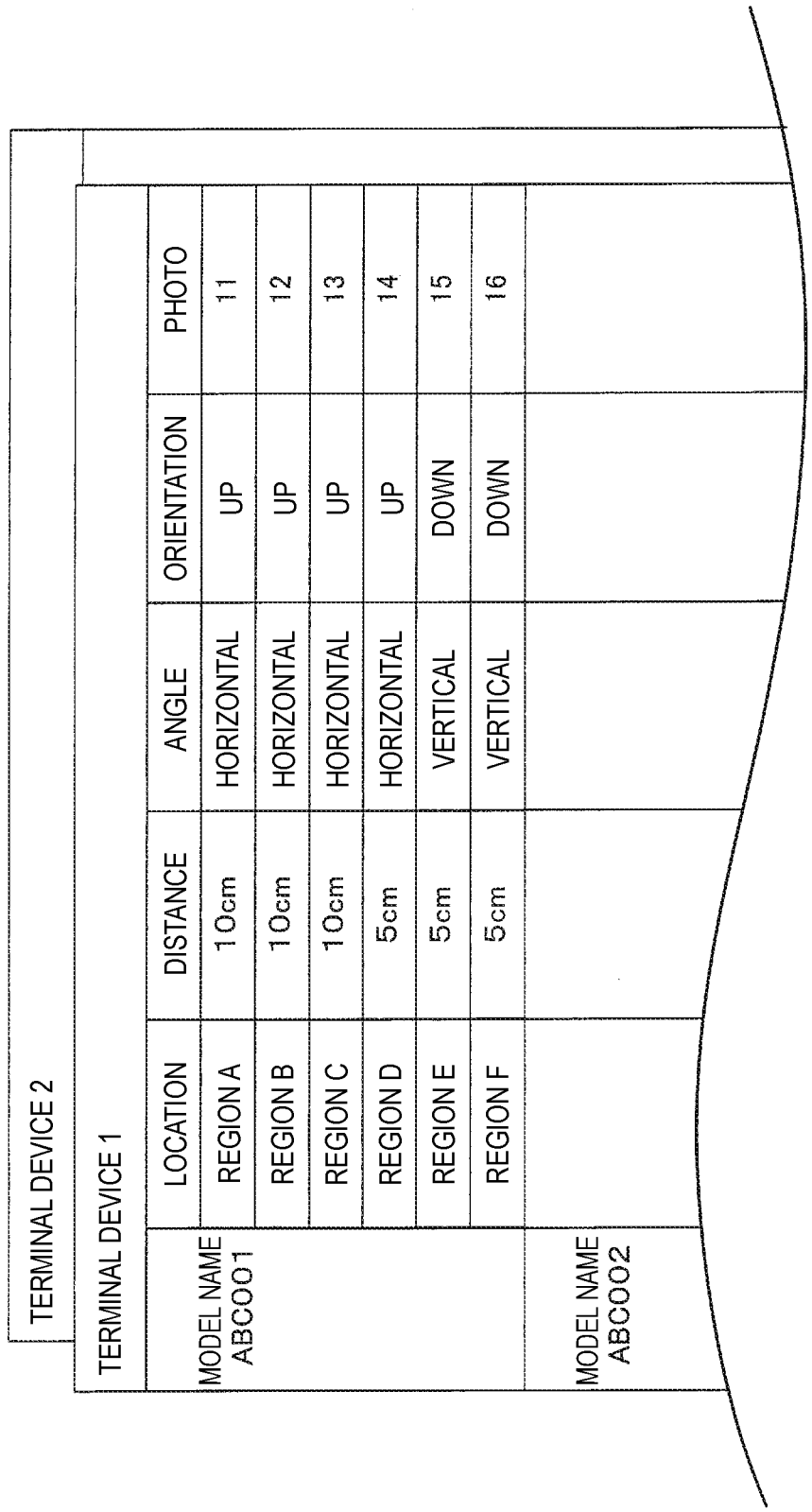
FIG. 15 is a diagram illustrating an instance of a position guidance list.

That is, for instance, a position guidance list is stored in the server apparatus 50 as illustrated in FIG. 15. For instance, in a case where the recording is performed at the region B with respect to the model ABC001 by the terminal device 1, the position guidance list is stored in which a distance is 10 cm, an angle is horizontal, a direction is set to the above, and a photo is selected as "12". The display data is transmitted to the terminal device 10, and thus the terminal device 10 acquires the display data.

When the information on the terminal device 10, for instance, the information on the placement of the microphone 17 is stored, guidance information may be generated using the information regarding the terminal device 10 in place of the position guidance list. For instance, if there is information that the microphone 17 is disposed at an upper portion of the terminal device 10, it is possible to determine that the upper portion of the terminal device 10 may preferably be directed toward the image forming apparatus 20 as a direction of the terminal device 10.

In the following step S114, a display image is generated based on the display data acquired in step S113, the generated display image is displayed on the display of the terminal device 10, and the processing is terminated. The display image may be generated by the server apparatus 50, or may be generated by the terminal device 10.

Figure 16:
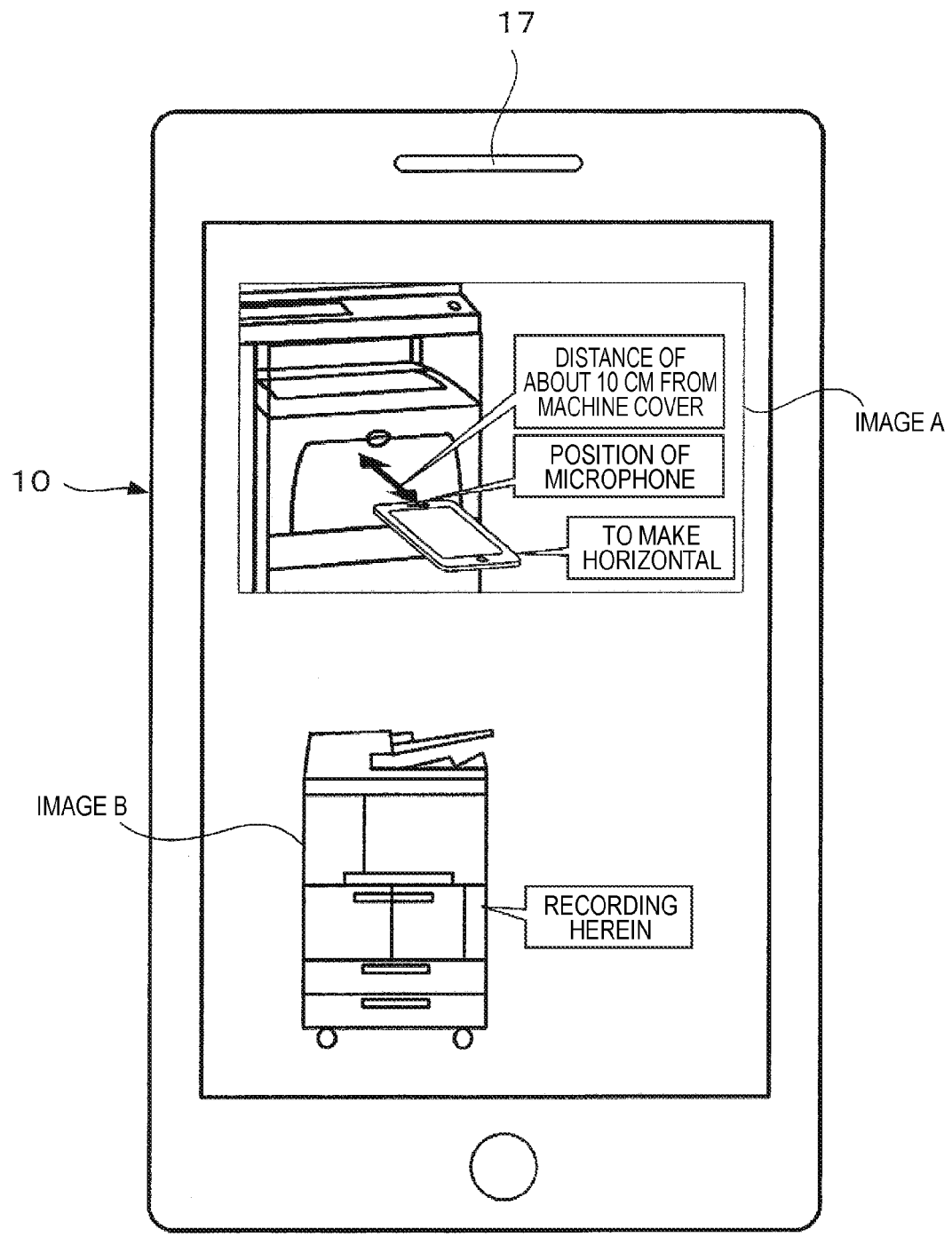
FIG. 16 is a diagram illustrating an exemplary display in the position guidance in the terminal device 10.

FIG. 16 illustrated an instance of the display image. In an image A displayed on the upper portion, a photo or a schematic diagram of the image forming apparatus 20 and the terminal device 10 is displayed in which the section at which the recording is to be performed is enlarged, and the photo or schematic diagram is displayed with a pop-up image such as "a distance of about 10 cm from a machine cover", "a position of the microphone", or "to make horizontal" with an arrow. The pop-up image such as "a distance of about 10 cm from a machine cover" is generated from distance information, the pop-up image such as "a position of a microphone" is generated from direction information, and the pop-up image such as "to make horizontal" is generated from angle information. However, it may store the pop-up image itself without generating the pop-up image.

In an image B on a lower portion, a photo or a schematic diagram of the image forming apparatus 20 are displayed, and a pop-up image such as a "recording herein" with an arrow is displayed as indicating a recording location on the photo or schematic diagram. Such a pop-up image is generated to be displayed at a position corresponding to the region selected in step S112. However, it may store the pop-up image itself without generating the pop-up image.

The image B has a side different from that of the image forming apparatus illustrated in FIG. 14, but may have a photo or schematic diagram of the same side as in FIG. 14.

Figure 17:
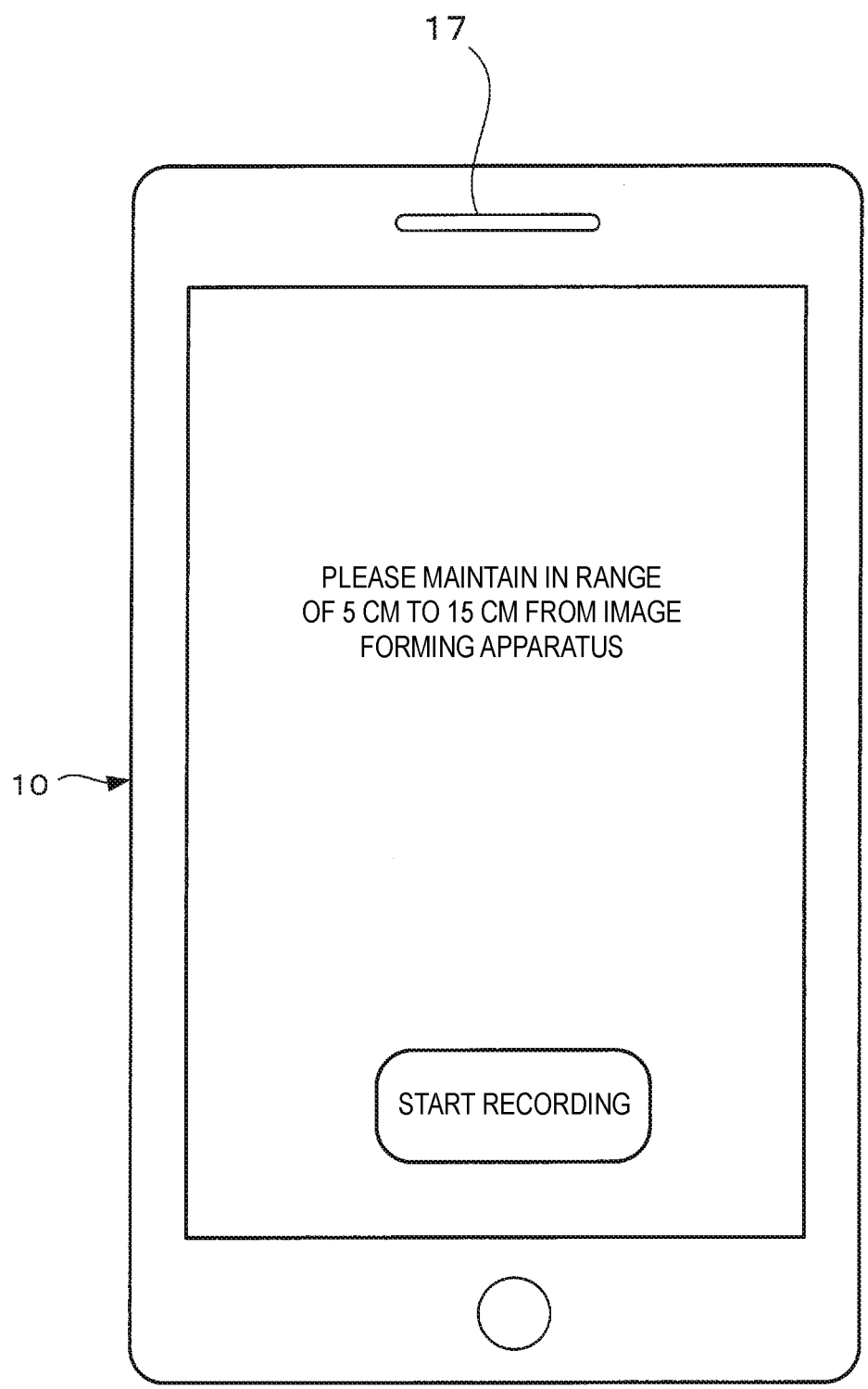
FIG. 17 is a diagram illustrating an exemplary display in the position guidance in a terminal device 10 according to another exemplary embodiment.

FIG. 17 illustrates a display screen of a terminal device 10 according to a second exemplary embodiment. In this second exemplary embodiment, the display screen is displayed with only characters, and is configured to show the range of position within which the detection can be performed without error by the terminal device 10. That is, the display screen of the terminal device is displayed with a text of "Please maintains in the range of 5 cm to 15 cm from the image forming apparatus", for example.

As another exemplary embodiment, the position of the terminal device 10 may be guided by a voice instead of displaying texts or photos, or in a manner of adding a voice to the texts or photos. Therefore, the phrase such as "output" including sound or display is used in the appended claims.

In the exemplary embodiment described above, while a case has been described in which the terminal device 10 is a tablet terminal device, the invention is not limited thereto. Thus, the invention can be applied also to a case where any other apparatus is used as the terminal device. For instance, in a case where an operation panel of the image forming apparatus 20 is configured to be attachable/detachable to/from a main body and communicable with the server apparatus 50 and have a built-in sound signal acquisition function, the operation panel may be used as the terminal device.

In addition, in the exemplary embodiment described above, while a case has been described in which the terminal device 10 has the microphone 17 built therein, in a case where a sound recording function is included in the terminal device 10, by externally connecting a sound collection device such as a microphone, a sound signal acquiring unit may be realized.

Furthermore, in the exemplary embodiment described above, while a case has been described in which a target apparatus for an abnormal sound analysis is an image forming apparatus, a target apparatus for the abnormal sound analysis is not limited to the image forming apparatus. Thus, the present invention can be similarly applied to any other apparatus having a possibility of generating an abnormal sound having periodicity.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A diagnosis system comprising:
   a terminal device comprising:
      a detection unit configured to detect sound;
      a display configured to display an outer appearance of a target apparatus, which is a target for detecting the sound by the detection unit, with the outer appearance divided into a plurality of regions;
      a receiving unit configured to receive a selection of one region from among the plurality of regions; and
      an output unit configured to output information regarding a position of the detection unit relative to the target apparatus depending on information of the selected one region;
   a memory configured to store the information regarding the position of the detection unit relative to the target apparatus so as to be associated with each of the regions displayed by dividing the outer appearance of the target apparatus; and
   a server apparatus comprising a transmission unit configured to transmit, among the information regarding the position of the detection unit relative to the target apparatus stored in the memory, the information regarding the position of the detection unit relative to the target apparatus depending on the information of the selected one region, to the terminal device.

\* \* \* \* \*